Figure 1:
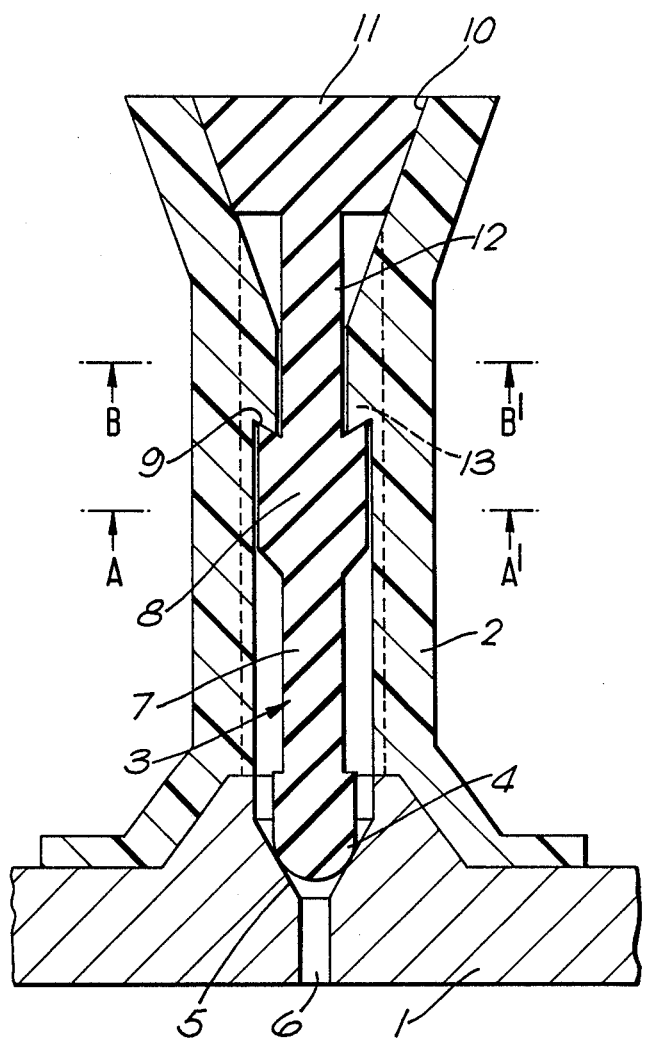

United States Patent [19]

Struth

[11] Patent Number: 4,798,226
[45] Date of Patent: Jan. 17, 1989

[54] CHARGING VALVE

[75] Inventor: Helmut Struth, Ingelheim am Rhein, Fed. Rep. of Germany

[73] Assignee: Boehringer Ingelheim KG, Ingelheim am Rhein, Fed. Rep. of Germany

[21] Appl. No.: 154,725

[22] Filed: Feb. 11, 1988

[30] Foreign Application Priority Data

Feb. 20, 1987 [DE] Fed. Rep. of Germany ....... 3705363

[51] Int. Cl.4 .............................................. F16K 15/14
[52] U.S. Cl. .............................. 137/512.4; 137/512.5; 137/843; 137/903
[58] Field of Search .................. 137/512.4, 512.5, 843, 137/903

[56] References Cited

U.S. PATENT DOCUMENTS

| 2,590,408 | 3/1952 | Henneman | 137/512.5 X |
| 2,888,034 | 5/1959 | Glegg | 137/512.4 |
| 3,554,214 | 1/1971 | Stenlund | 137/512.5 X |
| 3,584,834 | 6/1971 | Reid et al. | 137/903 |
| 3,965,930 | 6/1976 | Nicholls | 137/512.4 X |
| 3,976,278 | 8/1976 | Dye et al. | 137/512.4 X |
| 4,681,139 | 7/1987 | Falconer | 137/903 X |

Primary Examiner—John Rivell
Attorney, Agent, or Firm—David Frankhouser; Alan R. Stempel; Mary-Ellen M. Timbers

[57] ABSTRACT

A charging valve consisting of a valve sleeve and a valve stem fixed in the interior thereof comprises a valve which acts by compression and tension, the tension or compression being exerted by resilient parts of the valve stem adjacent to both valves.

1 Claim, 2 Drawing Sheets

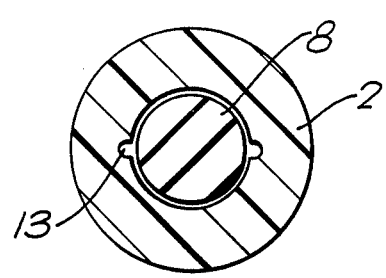
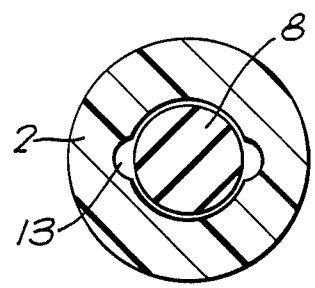
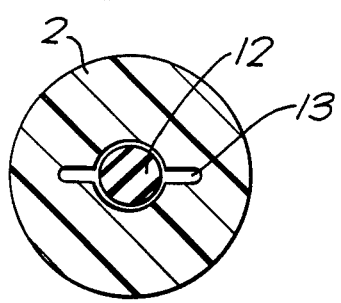
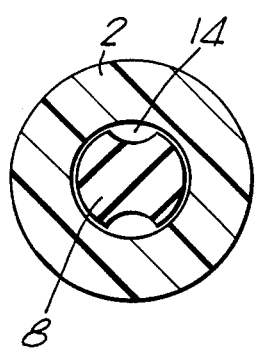
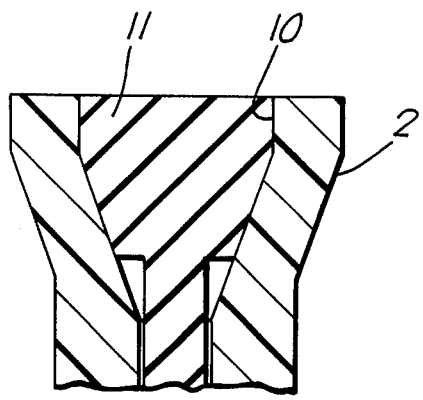

CHARGING VALVE

The invention relates to a charging valve with controlled drop formation; it is particularly suitable for delivering individual drops onto the atomizer plate of piezoelectric atomizers.

When piezoelectric atomizers are used, such as those described in German Offenlegungsschriften Nos. P 20 32 433, P 23 08 584, P 24 45 791, P 25 37 765 and P 26 37 162, the liquid which is to be atomized has to be delivered to the atomizer plate in a suitable manner. Accurate metering is particularly important if the liquid which is to be atomized is a pharmaceutical solution.

Devices for metering small amounts of liquid are already known.

The aim of the present invention is to propose a charging valve through which a very small amount of liquid or one drop of liquid can be reliably delivered.

The charging valve consists essentially of a tubular valve sleeve in which is located a valve spindle, the inwardly directed end of which, depending on its position, either closes off or opens up the inlet aperture to the metering device, whilst at the same time the outwardly directed end of the valve spindle closes off or opens up the outlet aperture.

The valve spindle is fixed in the sleeve in such a way that the entire spindle cannot be pushed outwards. However, it has two resiliently yieldable parts, one of which exerts compressive stress on the inwardly directed end of the valve spindle whilst the other exerts tensile stress on tee outwardly directed end of the valve spindle.

The valve spindle is conveniently made entirely of resilient material. The parts acting as the tensile and compressive elements are of such dimensions (particularly diameter and length) that they generate the tensile or compressive forces required to close off the inlet and outlet apertures. If desired, other resilient elements such as steel springs may also be incorporated.

An embodiment of the charging valve according to the invention (in its initial position) is shown in FIG. 1, in longitudinal section along its central axis.

The valve sleeve 2 is secured to the wall 1 of the container holding the liquid which is to be metered. The valve stem 3 is conveniently hemispherical in conformation at its inwardly directed end 4. The hemisphere is pressed into the conically widened portion 5 of the inflow conduit 6, the resilient reduced portion 7 of the valve stem acting as a compression spring. The valve stem 3 is secured by its thickened portion 8 which abuts on corresponding projections 9 in the valve sleeve. The mouth 10 of the valve sleeve is of conical conformation; it is closed off by a suitably shaped valve cone 11, the resilient tensile element 12 acting as a tension spring and pulling the valve cone 11 into the mouth of the valve sleeve. The inner wall of the valve sleeve has channels parallel to the longitudinal axis which convey the liquid past the thickened portion 8.

FIG. 2 shows a cross-section on the line A—A′ in FIG. 1.

Adjacent to the thickened portion 8 of the valve stem are the channels 13 in the valve sleeve 2.

The channels may also be constructed differently, e.g. as shown in FIG. 3.

FIG. 4 shows a cross section on the line B—B′.

FIG. 5 shows another embodiment of the valve cone 11 and the mouth 10 of the valve sleeve.

FIG. 6 shows a cross section through the thickened portion 8 of the valve stem 3, in which the recess 14 replaces the channels in the inner wall of the sleeve.

The method of operation of the charging valve according to the invention is described hereinafter.

When liquid is forced into the aperture 6 by the metering device, the non-return valve 4 opens counter to the pressure of the resilient element 7. The liquid flows through the recesses in the valve stem or through the channels 13 to the outlet valve consisting of the valve cone 11 and the conical mouth 10 of the valve sleeve. The pressure of the liquid lifts the valve cone 11 away from its seat counter to the tensile stress of the element 12 and thus allows the liquid to escape. The liquid (e.g. a drop) is then released from the mouth of the valve by the effects of gravity and falls onto the suitably Positioned atomizer plate (the longitudinal axis of the valve is in the horizontal position during use).

When the pressure from the metering device ceases, the non-return valve 4 closes. The tensile force of the element 12 then causes the liquid to be forced out from the annular gap between the mouth 10 of the sleeve and the valve cone 11, whilst the valve cone 11 returns to its original position.

The charging valve according to the invention may be made from conventional materials; the valve stem for example may be made of silicon rubber, the valve sleeve of polyethylene or any other sufficiently rigid and inert material.

What is claimed is:

1. A valve assembly, comprising:

a. a valve sleeve having a longitudinally running through bore;

b. a first valve seat at or near an inlet end of said bore;

c. a second valve seat at or near an outlet end of said bore; and, d. a valve spindle in said bore, having a first end which is adapted to be pushed outwardly into sealing relationship with said first valve seat, a second end which is adapted to be pulled inwardly into sealing relationship with said second valve seat, an anchoring portion which is fixedly secured to the inside of said bore, a resiliently yieldable portion between said first spindle end and said anchoring portion which provides compressive stress for pushing said first spindle end into sealing relationship with said first valve seat, and a resiliently yieldable portion between said second spindle end and said anchoring portion which provides tensile stress for pulling said second spindle end into sealing relationship with said second valve seat.

* * * * *